United States Patent Office 3,163,622
Patented Dec. 29, 1964

3,163,622
POLYCROTONALDEHYDE
Jerry N. Koral, Stamford, Conn., assignor to American Cyanamid Company, New York, N.Y., a corporation of Maine
No Drawing. Filed June 27, 1961, Ser. No. 119,817
6 Claims. (Cl. 260—67)

This invention relates to a novel process for the polymerization of crotonaldehyde. Further, this invention relates to a novel process for the polymerization of crotonaldehyde and to the product produced thereby. Still further, this invention relates to the production of polycrotonaldehyde having a high molecular weight.

It is an object of the present invention to provide a novel process for the polymerization of crotonaldehyde. It is a further object of the present invention to produce a superior, stable polymer of crotonaldehyde having a high molecular weight. These and other objects of the present invention will become more apparent to one skilled in the art upon reading the more detailed description set forth hereinbelow.

It is well-known in the art that crotonaldehyde may be polymerized by aldol condensation, see U.S. Patent 2,190,184. It is also known that crotonaldehyde can be polymerized to a polymer by aldol condensation under a pressure of 10,000 atmospheres and a high temperature, see Journal of Polymer Science, vol. 10, pages 149–154, 1953. Polycrotonaldehyde, having a molecular weight of about 350, has also been prepared by aldol condensation by using triethylamine as a catalyst and at a temperature of 110° C. for 96 hours, see Journal of Polymer Science, vol 7, pages 653–655, 1951.

However, it has not previously been known that a vinyl-type polymer of crotonaldehyde, i.e., one having in the linear chain a preponderance of the grouping

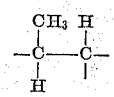

recurring, and having molecular weights above about 1000, generally within the range of 1200–5000, could be produced. The prior art is silent in respect to the production of polymeric crotonaldehyde having such high molecular weight by vinyl polymerization.

I have discovered that by using various tertiary phosphines as catalysts, a vinyl-type polymerization of crotonaldehyde can be effected. Additionally, the reaction can be carried out at relatively low temperatures and pressures. Even more surprising is the fact that the polymers, when produced, have molecular weights three to ten times higher than those polymers produced by aldol condensation in the prior art. Evidence of these truly new and unexpected results can be seen further in the examples presented hereinbelow.

As evidence of the structure of my novel polymer, the following theory is presented. Although I do not wish to be bound by any specific theory or reaction mechanism advanced, it is believed that the following occurs.

Upon examination of the structure of crotonaldehyde, it can be seen that there are three possible ways by which crotonaldehyde may polymerize. These three ways are (a) through the C=O group, (b) through the C=C group and (c) by a polyaldol condensation. By polyaldol condensation is meant the reaction of one carbonyl group with the second carbon atom of another aldehyde compound. These three types of polymerization result in polymers having the following schematic representation, respectively.

(a) 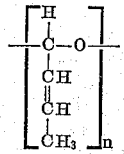

(b) 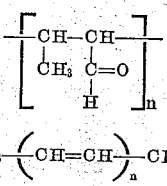

(c) 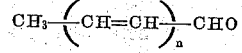

Analysis of the polymer produced by the process of the present invention showed that there are —OH, —C=O, —C=C—C=O— and —C—O—C— groups and that their ratio is dependent upon the method of preparation of the polymer. It was discovered that there are approximately 20% to 50% of carbonyl groups in the polymer. It can be seen therefore, that structures (a) and (c) would be eliminated as possibilities of the structure of my new polymer. Furthermore, the presence of appreciable amounts of —C—O—C— and —OH groups also support the elimination of structure (c).

If it is assumed that the polymerization is primarily propagated through the —C=C— groups, as I theorize, structure (b) would result. Additionally, if one assumes that some of the vicinal pendant aldehyde groups of structure (b) cyclizes as in polyacrolein) then a structure (d) can be drawn which has all the observed groups in their approximate concentrations and results in a high molecular weight linear polymer.

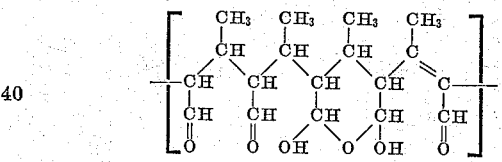

Further evidence that structure (c) is not the structure of my polymer is shown by the fact that upon ultraviolet measurements it was found that the polymer contained less than 5% of doubly conjugated carbons, i.e., (—C=C—C=C—). Additionally, the substantial absence of these doubly conjugated systems indicates that there are very few, if any, branches on the chain arising from aldol condensation of pendant aldehyde groups, see structure (e).

(e) 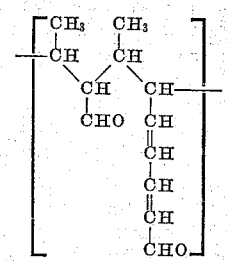

Finally, ultraviolet analysis of my polymer indicates that approximately 80% of the conjugated carbon atoms are singly conjugated. This evidence also supports the structure (d).

It can therefore be seen from the above evidence and theory, that I have produced a novel polymer of crotonaldehyde which may be produced at lower pressures, lower temperatures, and in greater yields than any polymer of crotonaldehyde heretofore shown. Additionally, my polymer has a molecular weight, as indicated above, substantially higher than those polymers of the prior art.

The crotonaldehyde polymers produced by the process of the present invention are soluble in many organic solvents and therefore may be used for the preparation of films. Additionally, it is possible to cross-link the crotonaldehyde polymer to produce resins useful in surface coatings and molding compositions. Additionally, polycrotonaldehyde may be used as a modifier for other resin compositions.

As mentioned above, I have discovered that certain tertiary phosphines possess the unexpected property of being able to catalyze the polymerization of crotonaldehyde to produce a new polymer thereof. The tertiary phosphines utilized in the process of the present invention must have a pKa of at least about 8.0. It has been found that any tertiary phosphine having a pKa significantly below about 8.0 will not enable the production of the new polymer.

The process disclosed herein has many advantages in addition to those mentioned above in respect to pressure, temperature and yields. Additionally, the tertiary phosphine catalysts are very easily handled, in other words, they are not spontaneously combustible in air. Further, the presence of a small amount of oxygen will not materially inhibit the polymerization and therefore conditions in respect to vacuum and water or oxygen exclusion do not have to be as closely scrutinized as in many other polymerization reactions.

The reaction is preferably carried out by adding crotonaldehyde, which has been purified prior to utilization thereof, to a reactor and bubbling an inert gas therethrough. The catalyst solution is then added to the reactor and the resulting mixture is agitated. The polymer begins to form almost immediately and after an optimum length of time a polymeric solid material can be isolated.

It is preferred in the instant invention that the monomer, catalyst and solvent be substantially pure before utilization thereof. In respect to the monomer, it is preferred that it is first dried over a material such as magnesium sulfate and distilled just before the process is initiated. With respect to the solvent and catalyst, it is preferred that these materials be substantially anhydrous and substantially oxygen-free. By "substantially anhydrous" is meant containing less than about 1% water separately or combined. By "substantially oxygen-free" is meant containing less than about 2% oxygen. Although the presence of water and $O_2$ in higher percentage is tolerable and does not retard polymerization, I have found that high amounts of water or oxygen materially decrease the molecular weight of the final polymer.

As mentioned above, the molecular weight of the polymers of the present invention are relatively high in respect to polymers of crotonaldehyde heretofore prepared. The molecular weights of the polymers of the instant invention usually range from about 1200 to about 5000, although higher molecular weights are also possible. These molecular weights are determined by the thermistor method described hereinbelow.

Thermistors are defined as thermally sensitive resistors. When determining the molecular weight of a polymer, two thermistors, one with a drop of solution of known molality on it and the other with the unknown solution on it, are placed in a chamber that is saturated with solvent vapor. The lower vapor pressure of the solutions results in condensations of solvent vapor on the thermistors. A temperature difference between the two thermistors is obtained because of the difference in activity of the drops of solution hanging on the thermistors. Using a special Wheatstone bridge circuit, temperature differences as low as $1.5 \times 10^{-4}$° C. can be detected. Once the instrument has been calibrated, the temperature difference (resistance difference) can be directly related to the number average molecular weight. A more detailed discussion of this method of molecular weight determination can be found in an article by Wilson et al., Anal. Chem., 33, 135 (1961).

The present process is carried out under relatively low temperatures. That is to say, temperatures of from about $-50$° C. to $100$° C. may be utilized with temperatures of $-20$° C. to $15$° C. being preferred. It is also preferred to use atmospheric pressure. However, it is possible to use subatmospheric or superatmospheric without substantially detracting from the efficacy of the instant process.

The present process can be carried out either in bulk or by solution polymerization. Examples of solvents which may be used in this process are toluene, methylene chloride, methanol, acetonitrile and the like. Generally, any material which is a solvent for the monomer and catalyst may be used.

The reaction is preferably carried out in the presence of an inert gas blanket so as to keep the oxygen content of the reaction vessel at a minimum. Various inert gases such as nitrogen, carbon dioxide, argon, neon, propane and the like may be used for this purpose.

Although the polymerization of the monomer is relatively instantaneous, it is preferred that the reaction be allowed to continue for a period of from about 2 hours to 20 hours in view of the fact that higher conversion and molecular weight of the polymer usually results during longer contact times.

The monomer concentration is generally within the range of from about 20% to about 90% when solvent polymerization is used. Obviously, however, when bulk polymerization is employed, monomer concentration is 100%.

As mentioned above, I have discovered that certain tertiary phosphines, having a pKa of at least 8.0, are useful to initiate the polymerization of the crotonaldehyde monomer. It can be seen from the following examples that certain well known and widely used aldehyde polymerization catalysts are inoperable in respect to crotonaldehyde. Examples of the tertiary phosphines which may be used in the process of the present invention include ethyldimethyl phosphine, methyldiethyl phosphine, triisobutyl phosphine, tripropyl phosphine, tributyl phosphine, trimethyl phosphine, triethyl phosphine, di-n-butoxyether phosphine, 1-methyl phosphorinane and the like.

The above mentioned catalysts may be used in concentrations ranging from about 0.2% to about 4%, based on the added monomer. Generally, the higher the percentage of catalyst used, the faster the conversion proceeds, however, preferably a range of from about 0.8% to 2% is used.

The pKa value, as the term is applied in the present invention, refers to the acid strength and not to the acid capacity of the catalyst. This pKa value is obtained by measurement of the protonated or unprotonated species in nitromethane. It is an equilibrium concept which signifies the relative strength of the acid or base under consideration. In the present invention, the higher the pKa, the more basic the tertiary phosphine.

The following examples are set forth for purposes of illustration only and are not to be construed as limitations on the present invention except as set forth in the appended claims. All parts and percentages are by weight unless otherwise indicated.

EXAMPLE 1

4.2 parts of crotonaldehyde, which was previously dried over anhydrous magnesium sulfate and distilled, is added to a suitable reaction vessel equipped with stirrer and gas inlet and outlet tubes. Dry nitrogen is bubbled through the aldehyde for several minutes and the vessel is then sealed. The vessel is immersed in a bath at $-15$° C. and 0.08 part of an ether solution containing 0.033 part of tributyl phosphine is added to the aldehyde. After about 20 minutes the reaction mixture becomes slightly viscous and within 16 hours turns solid. The reaction mixture is dissolved in toluene and precipitated into a large excess of hexane. A polymeric material is recovered and dried in a vacuum oven at 50° C. for 24 hours. A yield of 2.6 parts of a light yellow polymeric powder of crotonaldehyde is recovered. The intrinsic viscosity of the polymer in methyl ethyl ketone at 30° C. is 0.04 and the number average molecular weight thereof, as determined by the thermistor method, is 3270.

EXAMPLE 2

A suitable reaction vessel is charged with 21.5 parts of freshly distilled crotonaldehyde. The vessel is placed in a 0° C. bath and nitrogen is bubbled through the aldehyde for 5 minutes. 0.17 part of tributyl phosphine are then added to the vigorously stirred solution. After 15 minutes, the viscous solution is added to a large excess of hexane and a fine yellow powder precipitates. The powder is dried for 16 hours in a vacuum oven at 50° C. The yield is 6.2 parts, corresponding to a 29.3% conversion. The polycrotonaldehyde has an intrinsic viscosity of 0.029 in methyl ethyl ketone at 30° C. The number average molecular weight is 1080 as determined by the thermistor method, using methylene chloride as a solvent.

EXAMPLE 3

Into a suitable reaction vessel, there is charged 4.3 parts of crotonaldehyde and 4.0 parts of acetonitrile. The vessel is placed in a bath at 0° C. and carbon dioxide is bubbled through the solution for about 5 minutes. 0.033 part of tripropyl phosphine are added to the solution and the latter is maintained at 0° C. for 16 hours. The resin is then precipitated into a large excess of hexane and filtered. The recovered polymer is dried for 16 hours at 50° C. in a vacuum oven and a yield of 2.79 parts of polycrotonaldehyde is obtained. This corresponds to a conversion of 65%. The intrinsic viscosity of the polymer in methyl ethyl ketone at 30° C. is 0.048. The number average molecular weight, determined by the thermistor method, in methylene chloride, is 2040.

EXAMPLE 4

A suitable reaction vessel is charged with 4.3 parts of freshly distilled crotonaldehyde and 4.3 parts of toluene. Nitrogen is bubbled through the solution for about 5 minutes and then 0.066 part of tributyl phosphine are added. The reaction mixture is maintained at 0° C. for 16 hours. A viscous solution results and this solution is added to a large excess of hexane and a fine, yellow, powdery polymer precipitates. This polymer is recovered and dried for 16 hours in a vacuum oven at 50° C. The yield is 3.12 parts corresponding to a 73% conversion. The isolated polymer has an intrinsic viscosity in methyl ethyl ketone at 30° C. of 0.03 and a number average molecular weight, determined by the thermistor method, in benzene, of 1870.

EXAMPLE 5

8.6 parts of freshly distilled crotonaldehyde is charged into a suitable reaction vessel. Nitrogen is bubbled through the solution for 5 minutes and the vessel is cooled at −50° C. To this reaction mixture is then added 0.066 part of tributyl phosphine. The temperature of the vessel is maintained at −50° C. for 16 hours. A viscous solution results and this solution is added to an excess of hexane to precipitate a yellow resinous polymer. 0.41 part (4.7% conversion) of polycrotonaldehyde is isolated. The intrinsic viscosity of the resin in methyl ethyl ketone at 30° C. is 0.039. The number average molecular weight, determined in benzene using the thermistor method, is 2060.

EXAMPLE 6

Utilizing the procedure of Example 5, except that the temperature of the reaction is maintained at −23° C., 1.7 parts (40% conversion) of polycrotonaldehyde is recovered. The intrinsic viscosity of the polymer in methyl ethyl ketone at 30° C. is 0.042. Utilizing the thermistor method, the number average molecular weight is 2530.

EXAMPLE 7

(*Comparative*)

A suitable reaction vessel is charged with 4.3 parts of freshly distilled crotonaldehyde and nitrogen is bubbled through the aldehyde for about 5 minutes. The vessel is cooled to 0° C. and 0.033 part of phenyl diethyl phosphine (pKa=6.25) are added. No polymer is obtained after 48 hours.

EXAMPLE 8

(*Comparative*)

4.3 parts of freshly distilled crotonaldehyde is charged to a suitable reaction vessel and nitrogen is bubbled therethrough for about 5 minutes. 0.066 part of triphenyl phosphine (pKa=2.73) are added to the reaction vessel after it has been cooled to 0° C. No polymer is obtained after 48 hours.

EXAMPLE 9

(*Comparative*)

The procedure of Example 8 is again followed except that 0.2 part of triethyl amine are used in place of triphenyl phosphine. No polymer is recovered after 24 hours.

EXAMPLE 10

(*Comparative*)

Fifty parts of crotonaldehyde and 2.5 parts of triethyl amine were placed in a reaction vessel fitted with a condenser and stirrer. The reaction mixture was heated at reflux (100° C.), under nitrogen, for 96 hours. At the end of this time, a small amount of a dark brown, viscous resin was isolated by adding the solution to an excess of hexane. The resin was dried overnight in a vacuum oven at 50° C. and the yield was 6.5 parts. Infrared analysis showed a large amount of carbonyl groups, conjugated carbonyl groups and some hydroxyl groups which is consistent with a polyaldol product. The molecular weight determined by the thermistor method in methylene chloride at 30° C. was 354. (A similar experiment carried out by E. F. Degering and T. Standt, T. Polymer Sci., I, 653 (1951), yielded a product with a molecular weight of 350.)

I claim:

1. A process for the polymerization of crotonaldehyde to a homopolymer which comprises contacting substantially pure crotonaldehyde with a tertiary phosphine having a pKa value of at least about 8.0.

2. A process for the production of a homopolymer of crotonaldehyde which comprises contacting substantially pure crotonaldehyde with tributyl phosphine.

3. The process according to claim 1 wherein the phosphine is tripropyl phosphine.

4. A linear, vinyl homopolymer of crotonaldehyde having a molecular weight of at least about 1000.

5. A linear, vinyl homopolymer of crotonaldehyde having a molecular weight of from about 1200 to about 5000.

6. A linear, vinyl homopolymer of crotonaldehyde having a molecular weight of at least 1000 and having in the linear chain a preponderance of the grouping

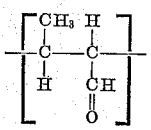

recurring.

(References on following page)

References Cited in the file of this patent

UNITED STATES PATENTS

| | | |
|---|---|---|
| 2,809,185 | Hearne et al. | Oct. 8, 1957 |
| 2,828,286 | MacDonald | Mar. 25, 1958 |
| 3,044,996 | Shokal | July 17, 1962 |
| 3,054,774 | Eifert et al. | Sept. 18, 1962 |

OTHER REFERENCES

Fieser et al.: Organic Chemistry, 3rd ed. (1956), p. 208, Reinhold Publishing Corp., New York.

Degering et al.: J. Poly Sci., vol. 7, pp. 653–6 (1951).

Carruthers et al.: Trans. Far. Soc., vol. 32, pp. 195–208 (1936).